United States Patent [19]

Clarke et al.

[11] Patent Number: 5,421,923
[45] Date of Patent: Jun. 6, 1995

[54] ULTRASONIC WELDING HORN WITH SONICS DAMPENING INSERT

[75] Inventors: Robert A. Clarke, Libertyville; Steven Neuenfeldt, Vernon Hills, both of Ill.

[73] Assignee: Baxter International, Inc., Deerfield, Ill.

[21] Appl. No.: 161,639

[22] Filed: Dec. 3, 1993

[51] Int. Cl.⁶ ............................................. B32B 31/16
[52] U.S. Cl. ................................. 156/73.1; 156/292; 156/580.2; 604/22
[58] Field of Search .................. 156/73.1, 73.4, 580.1, 156/580.2, 290, 292; 425/174.2; 264/23; 604/22; 53/375.8, 375.9, 376.6, 376.8, DIG. 2

[56] References Cited

U.S. PATENT DOCUMENTS 4,411,720  10/1983  Sager ..................................... 156/69
5,275,767   1/1994  Micciche ............................... 264/23

Primary Examiner—David A. Simmons
Assistant Examiner—J. Sells
Attorney, Agent, or Firm—Hill, Steadman & Simpson

[57] ABSTRACT

An ultrasonic welding horn is provided that has an insert connected to the body of the horn proximal to the welding edge, the insert being dampened from the ultrasonic operating frequency by attaching it to the horn body at a nodal point that has little or no vibration during the operational vibrational mode of the horn. During a welding operation, the insert is positioned to secure living cell tissue that is between two plastic layers, preventing undesirable vibration of the cell tissue. The welding edge, which extends around the periphery of the insert, contacts the plastic layers around the cell tissue, welding a seal between the layers.

23 Claims, 1 Drawing Sheet

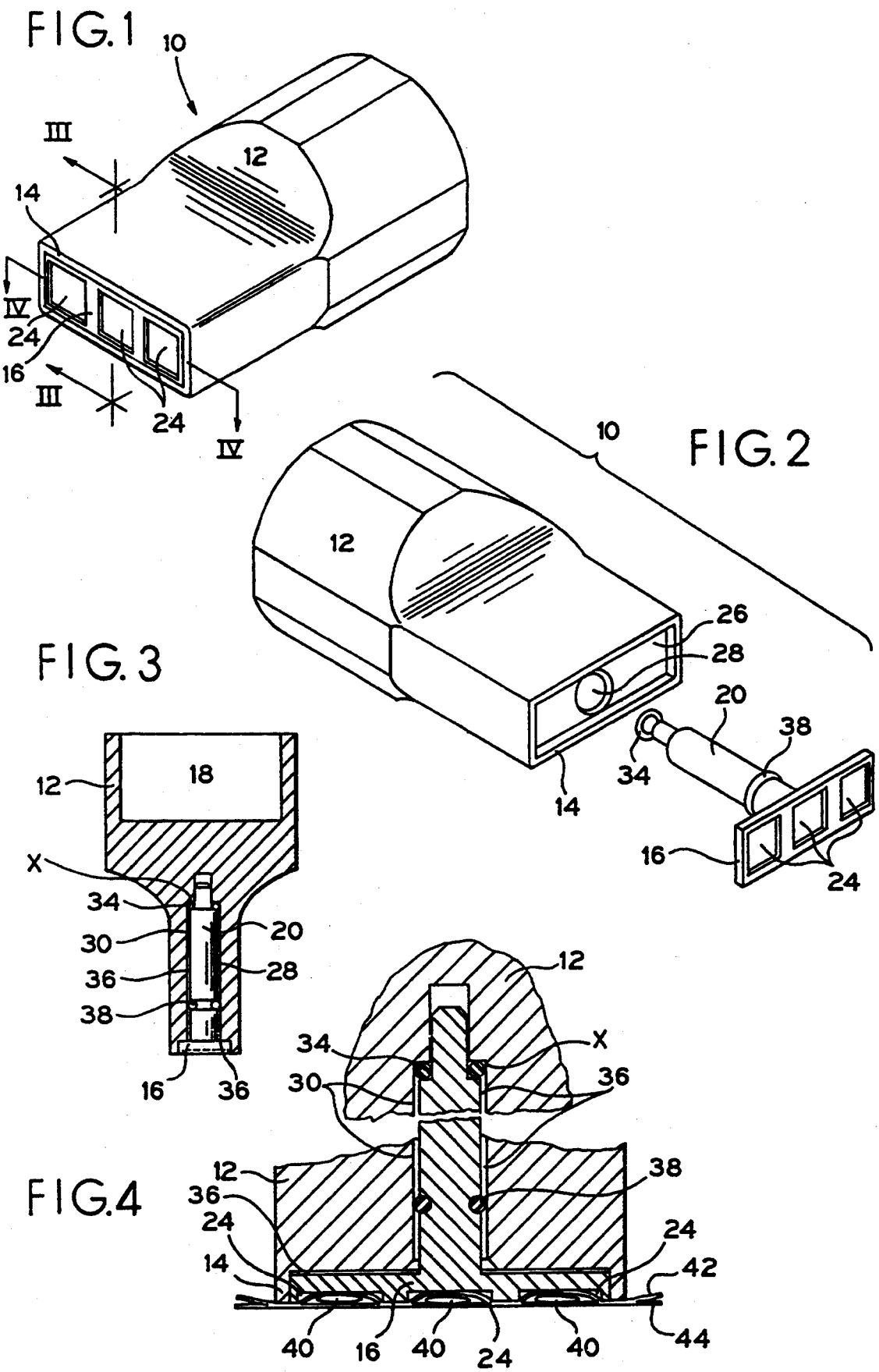

ULTRASONIC WELDING HORN WITH SONICS DAMPENING INSERT

BACKGROUND OF THE INVENTION

The present invention relates generally to a system and method for sealing plastic. More specifically, the present invention relates to a system and method for the ultrasonic welding of plastic materials.

It is known to use plastic to construct containers. In this regard, it is known to create a container by sealing together two layers of plastic. One method for sealing together layers of plastic is through ultrasonic welding. Ultrasonic welding can be performed using an ultrasonic welding horn.

A welding horn is generally shaped to have a welding edge contoured to the shape of the desired weld. An ultrasonic welding horn further includes a source of vibration which is usually piezoelectric. Activating the source initiates vibration which excites the mass of an ultrasonic horn to vibrate at an ultrasonic frequency. Because of equilibrium, the vibrational energy transferred to the mass of the horn must, in turn, leave the horn in the form of heat, sound waves or otherwise by affecting movement of another object in contact with the horn. Intermolecular friction transmits horn vibrations to the interface of two parts, heating the surfaces and causing material to flow.

A vibrating welding edge may be brought into contact with sealable plastic layers, causing them to melt. As a result, the melted layers become welded together, forming a seal at the weld.

A common application of ultrasonic welding is for encapsulating an object within sealed layers, such as between layers of plastic. For encapsulating an object, a horn generally has a welding edge which has an indentation that is larger than the object to be encapsulated. The object is positioned between plastic layers. The welding edge is then pressed against the plastic layers, receiving the object into the indentation, while the welding edge forms a seal around the object by melting together the layers.

During such a welding process, a traditional ultrasonic welding horn exposes the entire object being welded to significant amounts of ultrasonic vibration, sound energy and heat. Many objects that are sealed between plastic layers are inanimate and unaffected by such exposure. However, more sensitive objects are not so resistant.

In some surgical implantation techniques, cells may be sealed between plastic layers. Such sealed cell containing devices can be placed internally within the body of a patient for a variety of applications including gene therapy. Ultrasonic welding has been found to be an effective and economical way to seal cells within plastic layers. However, ultrasonic vibrational and sound energy from a traditional welding horn can damage or kill living cells. This damage can render the cells useless for the intended application. Thus, it has been a problem to perform an ultrasonic weld on capsules for living tissue without harming the tissue with vibrational energy.

Likewise, in other applications the vibrational energy from the ultrasonic horn can preclude ultrasonic welding as a feasible technique for creating plastic containers. For example, such is the case in creating certain medical devices that include membranes. A need, therefore, exists for an improved system and method for ultrasonic welding.

SUMMARY OF THE INVENTION

The present invention provides an ultrasonic welding horn for welding together plastic layers. More specifically, the invention provides an ultrasonic welding horn that minimizes the ultrasonic vibrational and sound energy to which the object being welded is exposed.

To this end, the invention utilizes the vibrational mode of the ultrasonic horn. An ultrasonic welding horn, as any rigid object, has a mode of vibration when excited at a given frequency. In such a mode, the horn is cyclically flexing. Some parts of the horn bend and move, while others move very little or not at all. Within stable limits, an object consistently vibrates in the same mode at a given frequency, and a selected nodal point will have consistent motion. Thus, a nodal point located on the horn at a position having little or no motion will behave consistently each time the horn is vibrated at the same frequency.

A welding horn utilizing the present invention comprises a source for generating vibration at an ultrasonic frequency, a rigid body connected to the source for being vibrated in a mode of vibration, an insert and a coupling means. The body has a nodal point that has relatively less vibration than the rest of the body when the body is vibrating in the mode. Also, the body has a welding edge. The insert is coupled to the body at the nodal point by the coupling means so that the insert is held proximal to the welding edge, but preferably not in contact with the body except by the coupling means.

In an embodiment of the invention, the coupling means is spring loaded.

In another embodiment of the invention, the coupling means has vibration dampening characteristics.

In yet another embodiment of the invention, the coupling means is an O-ring.

In an additional embodiment of the invention, the coupling means includes a second O-ring.

In a further embodiment of the invention, the coupling means is made of resilient plastic.

In a still further embodiment of the invention, the nodal point is at a position inside the body, and the insert has a stem that extends to the coupling means.

In still another embodiment of the invention, the insert has at least one indentation for securing an object through a plastic layer during a welding operation.

In another embodiment of the invention, the nodal point is located central to the mass of the horn, and the insert has a stem which is coupled to the nodal point.

An advantage of the present invention is that it provides an improved means for sealing together plastic layers.

Another advantage of the present invention is that it provides a means for sealing cells between plastic layers without causing damage to the cells.

A further advantage of the present invention is that it provides an ultrasonic welding horn that minimizes the damaging effects of ultrasonic sound, vibrational energy, and heat on cells that are being sealed between plastic layers by an ultrasonic welding process.

Still further, the present invention provides an ultrasonic welding horn that grips an object being sealed between plastic layers so that the object is held in proper position during a welding operation.

Additional features and advantages of the present invention are described in, and will be apparent from, the detailed description of the presently preferred embodiments as well as the drawings.

BRIEF DESCRIPTION OF THE DRAWINGS

FIG. 1 illustrates a perspective view of an assembled ultrasonic welding horn that embodies the features of the present invention.

FIG. 2 illustrates an exploded perspective view of an unassembled ultrasonic welding horn.

FIG. 3 illustrates a cross sectional view of an assembled ultrasonic welding horn taken generally along the line III—III of FIG. 1.

FIG. 4 illustrates a partial cross sectional view taken generally along the line IV—IV of FIG. 1 that shows the insert and the welding edge in contact with cell tissue between sealable plastic layers and shows an O-ring coupling means.

DETAILED DESCRIPTION OF THE PRESENTLY PREFERRED EMBODIMENTS

The present invention provides a system and method of ultrasonic welding that suppresses the transmission of energy from an ultrasonic welding horn. This allows the horn, for example, to be used to seal cells between sealable plastic layers. Of course, the horn can be used for traditional ultrasonic applications, e.g., creating empty plastic containers. However, the horn has particular application to those technologies wherein material that can be damaged by vibrational energy is sealed between plastic layers.

Referring to the drawings, FIG. 1 generally illustrates an embodiment of an ultrasonic welding horn 10 of the present invention. The welding horn 10 has a body 12 with a welding edge 14 and an insert 16. An ultrasonic vibrational source 18 is integral to the body 12 opposite the welding edge 14. Alternatively, the source 18 could be externally connected to the body 12.

The exploded perspective view of FIG. 2 illustrates the individual components of the ultrasonic welding horn 10. The insert 16 has a perpendicularly disposed stem 20 and in the embodiment illustrated indentations 24. The body 12 has a recess 26 shaped to receive the insert 16. The recess 26 has a bore 28 which is shaped to receive the stem 20. The welding edge 14 extends from the body 12 further defining the recess 26. The outer diameter of the stem 20 is slightly less than the diameter of the bore 28. An annular O-ring 34 is also provided for coupling the insert 16 in position.

Referring now to FIG. 3, which illustrates a cross-sectional view, the interrelation of the assembled components can be seen. The insert 16 is shown within the recess 26. The bore 28 is defined by a bore wall 30. The O-ring 34 is seated in the bore 28. The O-ring 34 is preferably made of a resilient material, such as rubber, other elastomers, urethane, plastic and the like, so that when the stem 20 is inserted in the bore 28, the O-ring 34 deforms to the shape of the stem 20, biasing the stem 20 and the bore wall 30 away from each other and holding the insert 16 in position. Also, the O-ring 34 preferably has vibration dampening characteristics that also assists to isolate the insert 16 from the ultrasonic vibration of the body 12. The means of coupling the insert 16 to the body 12 does not have to be an O-ring. But preferably the means are spring-biased and provide vibration dampening. As illustrated, preferably, the insert 16 does not touch the body 12, as the insert 16 is separated from the body 12 by a gap 36.

The welding edge 14 extends to a substantially flush position with the insert 16. The welding edge 14 surrounds the periphery of the insert 16, although the welding edge 14 is separated from the insert 16 by the gap 36.

The source 18 can be electrically activated to produce vibrations at an ultrasonic operating frequency. The vibrations generated by the source 18 are transmitted through the body 12 which moves and flexes in a cyclic vibrational mode. In this vibrational mode, most parts of the body 12 have cyclic movement at the operational frequency. However, the body 12 is cyclically flexing around nodal point X which has little or no movement.

Nodal point X identifies the portion of the body 12 to which the insert 16 is coupled via the O-ring 34. Because the insert 16 is coupled near nodal point X, the insert 16 itself has little or no vibration despite the vibration of the body 12. It is, in many applications, desirable to locate the O-ring 34 as near to nodal point X as possible.

The location of nodal point X must be identified for each different horn body design. Nodal point X is selected as the point of the body at which there is preferably the least amount of vibration. A variation in the shape of the body 12 can alter its mode of vibration and the location of nodal point X. Points on the bore wall 30 may have vibration of increasing amplitude the farther they are from nodal point X. However, the bore wall 30 near nodal point X, if it vibrates at all, vibrates at a substantially lower amplitude than other portions of the body 12. Therefore, the O-ring 34 holds the insert 16 in a substantially non-vibrational state so long as it touches the bore wall 30 proximal to nodal point X, even though parts of the bore wall 30 in contact with the O-ring 34 might have some relatively low amplitude vibration.

Optionally, a second O-ring 38 can be also disposed between the stem 20 and the bore wall 30. The second O-ring 38 provides additional coupling support for the insert 16 to maintain the gap 36 between the insert 16 and the recess 26. The second O-ring 38 does not contact the body at nodal point X, however, the second O-ring 38 preferably has vibration dampening characteristics. Therefore, no significant vibration is transmitted from the body 12 to the insert 16 through the second O-ring 38.

The body 12 may become hot when it is vibrated at the ultrasonic operating frequency. This heat is transmitted to the welding edge 14. However, the insert 16 does not become hot because of the insulation provided by the gap 36, although the insert 16 might have a nominal increase in temperature due to the radiation of heat across the gap 36 from the body 12. Also, because the O-ring 34 and the optional second O-ring 38 are preferably made of an insulating material such as rubber or plastic, little heat is conducted from the body 12 to the insert 16. Therefore, the welding edge 14 rises to a sufficient welding heat, while the insert 16 remains significantly cooler.

FIG. 4 illustrates the horn during the welding process. In this illustrated embodiment, cells are being welded between plastic layers. Under the welding horn 10, cells 40 are positioned between a top plastic layer 42 and a bottom plastic layer 44. As the welding horn 10 is moved downward, the insert 16 engages the top plastic layer 42 and receives the cell tissue 40 into the indentations 24. This engagement secures the cells in place. The vibrating welding edge 14 then presses the top plastic layer 42 onto the bottom plastic layer 44, forming a sealed weld 46 around the cells 40. The welding horn 10 is then retracted from the sealed plastic layers 42 and 44.

Because the insert 16 receives and secures the cells 40 through the top plastic layer 42 during the welding process, the cells 40 are held securely, preventing harmful levels of vibration from being transmitted from the body 12. Any vibration that is transmitted to the cells 40 through the contact of the welding edge 14 to the sealed plastic layers 42 and 44 is dampened by the insert 16. Also, the insert 16, being disposed between the body 12 and the cells 40, shields the cells 40 from ultrasonic sound waves that emanate from the body 12. Furthermore, the insert 16 remains cool, protecting the cells 40 from heat.

As noted previously, the ultrasonic welding horn 10 can be used in other applications to create other devices. For example, the horn can be used to create medical devices that include membranes. By using the horn, any possible damage to the membranes will be minimized.

Understandably, various changes and modifications to the presently preferred embodiments described herein will be apparent to those skilled in the art. Such changes and modifications can be made without departing from the spirit and scope of the present invention and without diminishing its attendant advantages. Therefore, the appended claims are intended to cover such changes and modifications.

We claim:

1. An ultrasonic welding horn comprising:
    a rigid body having a welding edge, the body including means for connecting the body to a source of ultrasonic vibration, the body having a mode of vibration in response to the source and a recess in the welding edge, the body having a nodal point which has less vibration than other portions of the body when the body is vibrating due to the source;
    an insert received within at least portions of the recess; and
    a coupling means, coupling the insert to the body at the nodal point to dampen the insert from ultrasonic vibrations.

2. The ultrasonic welding horn according to claim 1 wherein the coupling means is spring loaded.

3. The ultrasonic welding horn according to claim 1 wherein the coupling means has vibration dampening characteristics.

4. The ultrasonic welding horn according to claim 1 wherein the coupling means includes an O-ring.

5. The ultrasonic welding horn according to claim 1 wherein the coupling means is made of resilient material.

6. The ultrasonic welding horn according to claim 1 wherein the insert has at least one indentation.

7. The ultrasonic welding horn of claim 1 including a gap between the insert and the welding edge.

8. The ultrasonic welding horn of claim 1 wherein the insert includes a stem that is coupled by the coupling means to the nodal point.

9. A method of sealing an object between plastic layers comprising the steps of:
    placing the object between the plastic layers;
    activating an ultrasonic welding horn having a welding edge to vibrate at an ultrasonic frequency, the welding horn further having an insert that is dampened from ultrasonic vibration, the insert being positioned in a recess; and
    pressing the welding horn against the plastic layers such that the welding edge contacts the plastic layers and welds the layers together around the object.

10. The method according to claim 9 wherein the object includes cells.

11. The method according to claim 9 wherein the insert has at least one indentation.

12. The method of claim 9 including the step of coupling the insert to a nodal point of the ultrasonic welding horn.

13. A method of sealing cells between plastic layers comprising the steps of:
    placing the cells between the plastic layers;
    activating an ultrasonic welding horn having a welding edge to vibrate at an ultrasonic frequency, the welding horn having an insert that is dampened from ultrasonic vibration, the insert being positioned in a recess of the welding edge;
    pressing the welding horn against the plastic layers the welding edge contacting the plastic layers and welding the layers together around the living cell tissue.

14. The method according to claim 13 wherein the insert has at least one indentation.

15. The method of claim 13 including the step of coupling the insert to a nodal point of the ultrasonic welding horn.

16. An ultrasonic welding system comprising:
    a source of ultrasonic energy;
    a rigid body having a welding edge, the body including means for connecting the body to a source of ultrasonic vibration, the body having a mode of vibration in response to the source and a recess in the welding edge, the body having a nodal point which has less vibration than the rest of the body when the body is vibrating due to the source;
    an insert received within the recess; and
    a coupling means, coupling the insert to the body at the nodal point so that the insert is held proximal to the welding edge within the recess to dampen the insert from ultrasonic vibration.

17. The ultrasonic welding system according to claim 16 wherein the coupling means is spring loaded.

18. The ultrasonic welding system according to claim 16 wherein the coupling means has vibration dampening characteristics.

19. The ultrasonic welding system according to claim 16 wherein the coupling means is one or more O-rings.

20. The ultrasonic welding system according to claim 16 wherein the coupling means is made of a resilient material chosen from the group consisting of: plastic; elastomer; urethane; and rubber.

21. The ultrasonic welding system according to claim 16 wherein the insert has at least one indentation for securing an object through a plastic layer during a welding operation.

22. The ultrasonic welding system of claim 16 including a gap between the insert and the welding edge.

23. The ultrasonic welding system of claim 16 wherein the insert includes a stem that is coupled by the coupling means to the nodal point.

* * * * *